(No Model.)
R. L. FROST.
BUSHING FOR VALVE CHESTS.
No. 458,623. Patented Sept. 1, 1891.
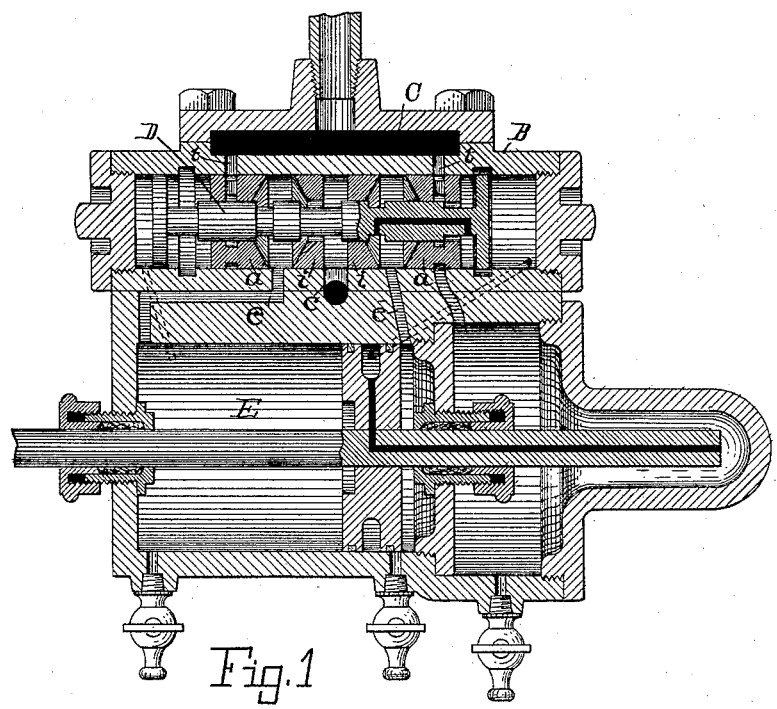
Fig. 1
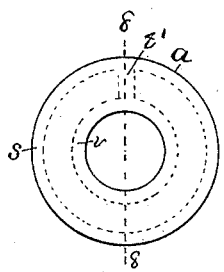 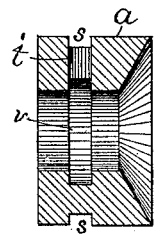  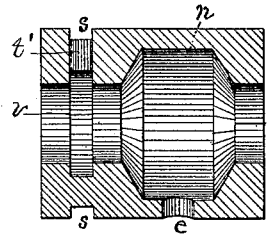
Fig. 2　Fig. 3　Fig. 4　Fig. 5
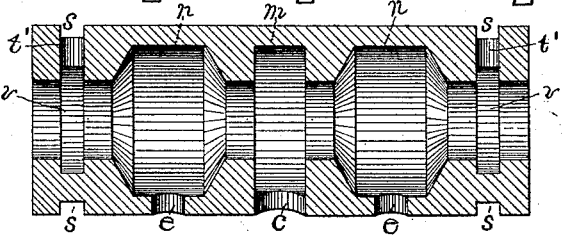
Fig. 6
Witnesses:
Walter S. Wood
S. N. Busk
Inventor.
Richard L. Frost
By Lucius C. West
Att'y.

UNITED STATES PATENT OFFICE.

RICHARD L. FROST, OF BATTLE CREEK, MICHIGAN, ASSIGNOR TO THE UNION MANUFACTURING COMPANY, OF SAME PLACE.

BUSHING FOR VALVE-CHESTS.

SPECIFICATION forming part of Letters Patent No. 458,623, dated September 1, 1891.

Application filed September 2, 1890. Serial No. 363,758. (No model.)

*To all whom it may concern:*

Be it known that I, RICHARD L. FROST, a citizen of the United States, residing at Battle Creek, county of Calhoun, State of Michigan, have invented a new and useful Bushing for Valve-Chests in Steam-Pumps, &c., of which the following is a specification.

This invention consists of a bushing made of suitable metal inserted in steam-chests in which automatic steam-actuated valves are employed or other valves needing bearings in the chest, whereby I am enabled to obtain a smooth, clean, and true surface for the bearings of the valve, which I have found it almost impossible to do in the ordinary chest in which the bearing-bridges are cast integral in the chest, owing to the shrinkage and holes and roughness, &c.

In the drawings forming a part of this specification, Figure 1 is a sectional elevation of a steam-pump having a steam-chest in which is employed an automatic steam-actuated valve. Fig. 2 is an end view of Figs. 3, 5, and 6, looking from a point at the left. Figs. 3 and 4 are enlarged lettered details from Fig. 1; and Figs. 5 and 6 show changes in the construction of the valve-bushing shown in the other figures by making the parts integral with each other, Figs. 3, 4, 5, and 6 being in section on line 8 8 in Fig. 2.

Referring to the lettered parts of the drawings, Fig. 1 shows a pumping apparatus, the piston-cylinder of which is shown at E, the steam-chest at B, and the steam-actuated valve at D, all substantially as patented to me July 1, 1890, No. 431,045.

The valve-bushing which I have here illustrated is especially adapted for use in the valve-chest in said steam-pump, or rather the valve-chest thereof, although a bushing upon this same principle may be employed in other valve-chests and engines for other purposes than pumping.

Figs. 3 and 4 illustrate the two bushings $a$ $i$ in the steam-chest B at the right hand of exhaust-port $c$. These bushings $a$ and $i$ are separated from each other, and their faces, which are contiguous to each other, are internally funnel form, so that the live-steam port $e$ will not be closed, and neither will the port be closed which is represented by a black line longitudinal in the end of the steam-actuated valve D, which receives steam through the annular port of said valve and from the port $t$ through the upper wall of the valve-chest, and in this construction through the external annular port $s$, the internal annular port $v$, and the port $t'$ in the bushing communicating with the ports $s$ and $v$ of the bushing $a$ of the valve. These bushing-blocks have a longitudinal hole through the center, which is finished to fit the peripheral surfaces of the valve, which has reciprocating bearings through them. There are two bushing-blocks $a$ $i$ at the left hand of the exhaust-port $c$. These bushing-blocks may be made separated, as in Figs. 3 and 4, or combined the two in one, as in Fig. 5, in which latter case they will be provided with an internal chambered or annular port, as at $n$ in said figure which will correspond to the space between the ends of the bushing-blocks in Fig. 1, so that the live steam can be passed down through live-steam port $e$. All of these bearing-blocks can be made in one integral whole, as in Fig. 6, by providing the same at the center with an internal annular port or recess $m$, which will allow the steam to communicate from the valve with the exhaust-port $c$, and which port will be equivalent to the separation between the blocks $i$ $i$ in Fig. 1. These bushing-blocks are prepared and dressed internally and externally to the proper smoothness and trueness, and are then pressed into place endwise into the steam-chest under pressure, the steam-chest of course having been cored and reamed to a proper size throughout its length to receive them.

While the pump and valve are not new as here shown in this application, still the ports in the bushings are especially adapted to register and coact with the peculiar ports in my former pump referred to. I do not wish to limit my invention to this peculiar construction of pump, nor to this peculiar construction of valve, so far as the peculiar steam-ports in the valve-chest, valve, cylinder, and bushing-blocks are concerned, as it will appear obvious that an attachable bushing having other ports adapted for any particular valve and valve-chests and the ports therein may be employed, whether some of the ports are produced by making the bushing in separated blocks or making the bushing as one integral whole for a given steam-chest, but having external and internal annular ports performing proper functions, and still be in keeping with the principles of my invention.

Having thus described my invention, what I claim as new, and desire to secure by Letters Patent of the United States, is—

The combination of a valve-chest and an automatic steam-actuated valve therein, said valve and chest being provided with suitable ports, and the separated bushing-blocks or their described equivalent, having suitable internal and external annular ports coacting with the ports of said valve and chest, substantially as set forth.

In testimony of the foregoing I have hereunto subscribed my name in presence of two witnesses.

RICHARD L. FROST.

Witnesses:
D. W. LOVELL,
STEVEN S. HULBERT.